June 18, 1963 G. GERARD ETAL 3,093,862
COMPACT HYDROSTATIC PRESSURE APPARATUS
Filed May 24, 1961 3 Sheets-Sheet 1

INVENTORS.
GEORGE GERARD &
JACOB BRAYMAN
BY
Brumbaugh, Free, Graves & Donohue
their ATTORNEYS

INVENTORS.
GEORGE GERARD &
JACOB BRAYMAN their ATTORNEYS

June 18, 1963  G. GERARD ETAL  3,093,862
COMPACT HYDROSTATIC PRESSURE APPARATUS
Filed May 24, 1961  3 Sheets-Sheet 3

INVENTORS.
GEORGE GERARD &
JACOB BRAYMAN
BY
Brumbaugh, Free, Graves & Donohue
their ATTORNEYS

United States Patent Office 3,093,862
Patented June 18, 1963

3,093,862
COMPACT HYDROSTATIC PRESSURE APPARATUS
George Gerard, Yonkers, and Jacob Brayman, Staten Island, N.Y., assignors to Barogenics, Inc., a corporation of New York
Filed May 24, 1961, Ser. No. 112,265
19 Claims. (Cl. 18—16.5)

This invention relates to high pressure hydrostatic devices and, more particularly, to a new and improved apparatus for applying extreme pressures which is characterized by its compactness and efficiency of operation.

This application is a continuation-in-part of our copending application for "Super-High Pressure Apparatus," Serial No. 785,690, filed January 8, 1959 and now Patent 3,044,113.

In our above-mentioned copending application an apparatus for applying extreme pressures to an object or workpiece is described which comprises an assembly of wedge-shaped pressure-multiplying anvil members forming a central cavity in which the workpiece is placed. The anvil assembly is positioned within a housing and surrounded by a resilient pressure-transmitting medium and the apparatus includes an arrangement for applying conventional high pressures to the exterior of the pressure-transmitting medium. This apparatus occupies considerable volume and has substantial weight in relation to the volume of the workpiece and the pressure applied thereto. In addition, loading and unloading of the workpiece from the apparatus requires complete disassembly of the apparatus.

Accordingly, it is an object of the present invention to provide a hydrostatic pressure apparatus which overcomes the above-mentioned disadvantages of the former apparatus.

Another object of the present invention is to provide a new and improved hydrostatic pressure apparatus which is compact and relatively simple to load and unload.

These and other objects of the present invention are accomplished by providing an anvil support cage arranged to receive and individually support, in operative relation, a plurality of anvil members and permit relative motion thereof from a retracted position to a pressure-transmitting position. To this end, the cage is provided with openings having tapered seats to receive tapered sections of the anvil members and sealing means is provided at these openings so that the exterior of the cage and anvil assembly is effectively sealed from the interior thereof, the cage and anvil assembly being disposed inside a pressure-tight vessel. If desired, yieldable retracting means may be provided between each anvil member and the support cage to retain the anvil members in a normally retracted position but which will permit motion of the anvil members to a pressure-transmitting position when pressure is applied to the exterior of the cage and anvil assembly.

In one embodiment of the invention, an inner cage assembly including a second plurality of secondary anvil members surrounding and transmitting pressure to the workpiece is located within the anvil cage and slidably removable therefrom upon withdrawal of one of the primary anvil members. Furthermore, the inner cage is preferably constructed so that an electrical current can be applied to the workpiece by passing it through the secondary anvils and, for this purpose, the inner cage is made of inner and outer conductive portions which are separated by an insulative layer and connected to opposite terminals of a source of current. Certain of the secondary anvil-receiving apertures in this cage are insulated along their boundary with the inner cage portion and the rest of the apertures are insulated along their boundary with the outer cage portion so that some of the secondary anvils carry current to the workpiece and others conduct it away from the workpiece.

In addition, each of the primary anvil members may be made in two portions, an inner portion contacting the corresponding secondary anvil member or the workpiece and an outer portion exposed to the hydrostatic fluid surrounding the cage and anvil assembly and the mating surfaces of the two portions may be formed so that they normally engage only at a central area, but under pressure the entire areas of the mating surfaces come into contact as the outer portion of the anvil is deflected. This arrangement permits relative rotative motion between the outer anvil portion and the anvil cage without disturbing the relation between the inner anvil portion and the secondary anvil or the workpiece.

Further objects and advantages of the invention will be apparent from a reading of the following description in conjunction with the accompanying drawings, in which.

Figure 1:
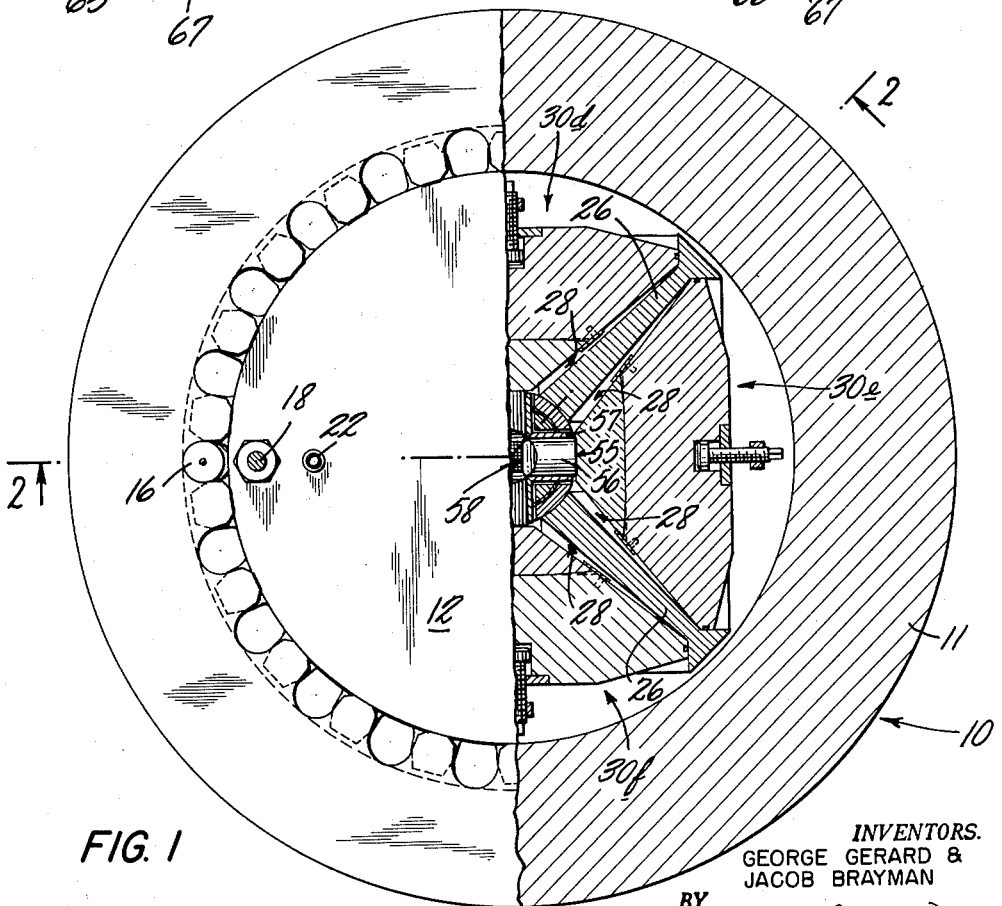
FIG. 1 is a plan view, partly in section, taken along the line 1—1 of FIG. 2 illustrating a representative hydrostatic apparatus according to the invention.
Figure 2:
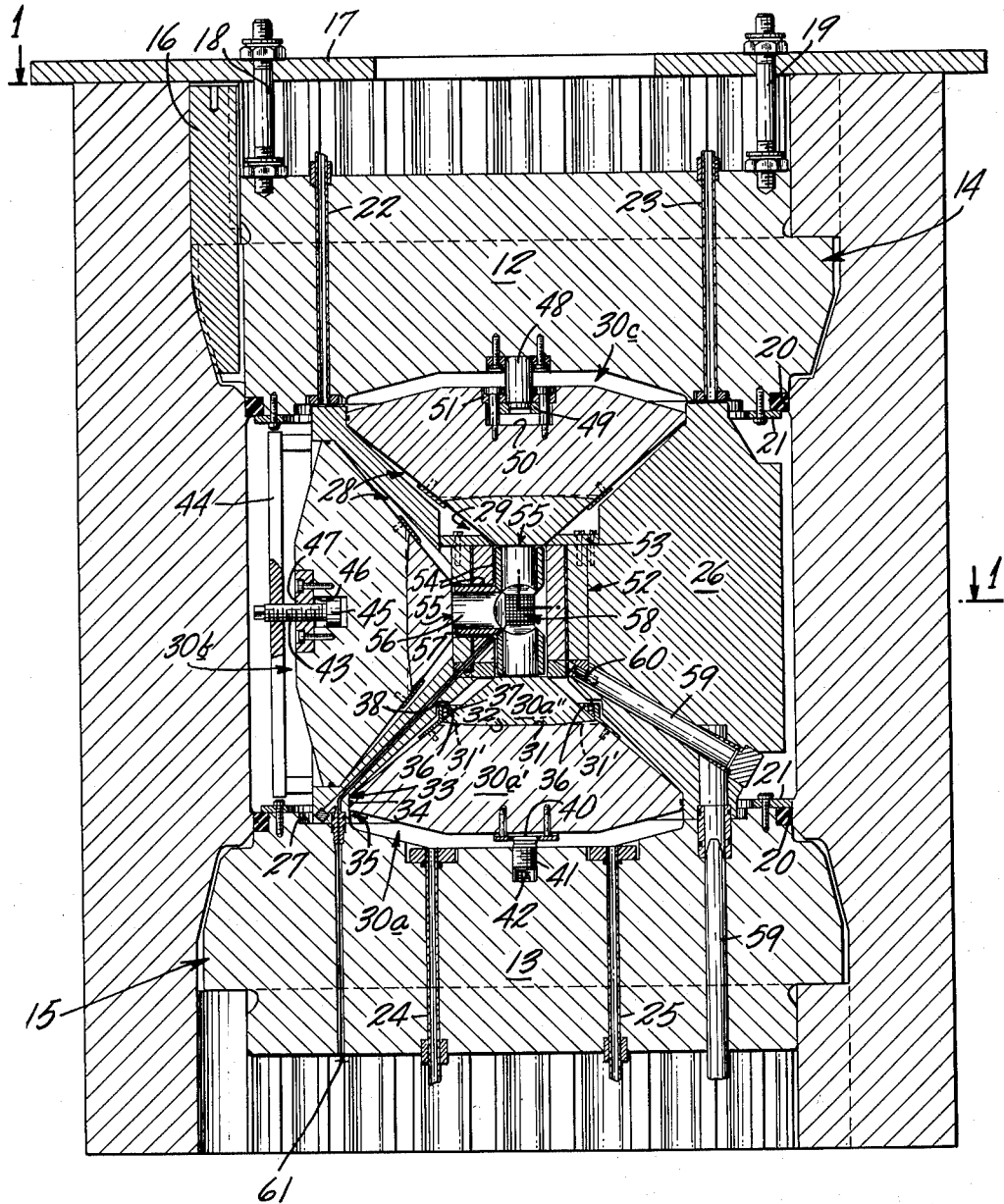
FIG. 2 is a view of the apparatus in longitudinal section taken along the line 2—2 of FIG. 1 and looking in the direction of the arrows.

In the embodiment of the invention shown in FIGS. 1 and 2 the hydrostatic apparatus comprises a pressure-tight housing 10 consisting of a tubular shell 11, an upper head 12, and a lower head 13, the upper and lower heads being removably mounted in the shell 11 by bayonet-type connections indicated at 14 and 15 respectively. When each head is mounted in the shell, a locking pin 16 is inserted in aligned openings in the head and shell to prevent relative rotative motion therebetween. In addition, after the upper head 12 is in position, a top plate 17 is placed across the top of the shell 11 and the head 12 is pulled up tight against the mating portion of the shell by tightening two bolts 18 and 19 which are affixed to the head and extend through the top plate.

Each of the heads 12 and 13 is provided with a gasket ring 20 which is held in place by a retaining ring 21 so as to form a pressure-tight seal between the corresponding head and the shell 11. Also two high pressure fluid conduits 22, 23 and 24, 25 pass through each of the heads 12 and 13, respectively, to admit hydraulic fluid under pressure to the interior of the pressure housing 10.

It will be understood that any alternate form of pressure-tight housing may be used with the invention, such as the housing described in our copending application Serial No. 833,420, filed August 13, 1959, and now Patent 3,063,594 for example, and that the housing may have any desired shape in accordance with the particular configuration of the enclosed cage and anvil assembly, which is described hereinafter.

In accordance with the present invention, an anvil supporting and inter-anvil sealing member in the form of a cage 26 is placed within the enclosure, the cage being supported on the horizontal surface 27 formed in the top of the lower housing head 13. This cage is provided with a plurality of tapered openings 28 leading from its exterior surface to an internal cavity 29 and within these openings are disposed a plurality of tapered primary anvil assemblies 30a, 30b, 30c, 30d, 30e, and 30f. Although the embodiment of the invention illustrated in FIGS. 1 and 2 utilizes a cubic cage and anvil configuration with six anvil assemblies supported in the cage for motion along three orthogonal axes intersecting at the center of the cavity 29, it will be readily apparent that other cage and anvil configurations, such as tetrahedral, octahedral, delta, etc. may be provided according to the shape of the workpiece.

Inasmuch as the pressure to which each anvil assembly is subjected during operation of the apparatus is substantially greater at the inner surface, adjacent to the cavity 29, than it is at the outer surface, the anvil assembly is preferably composed of outer and inner portions separated along a surface transverse to the direction of motion, the inner portion being made of a very hard material such as tungsten carbide. As an example, the lower anvil 30a shown in FIG. 2 consists of an outer portion 30a' and an inner portion 30a" shaped with mating surfaces 31 and 32, respectively. The outer portion has a cylindrical end 33 provided with a sealing ring 34 which fits within a corresponding bore 35 in the cage 36 to provide a pressure-tight seal between the cage and the anvil assembly, and the inner anvil portion 30a" is retained in position at the inner end of the portion 30a' by a plurality of inwardly extending plates 36 which are affixed to the outer portion. If desired, certain of these plates may be provided with springs 37 which bear against seats 38 formed in the adjacent portion of the cage 26. These springs have sufficient strength to restore the anvil assembly to a retracted position after the pressure has been removed from its outer surface, but they are not strong enough to restrict inward motion of the anvils when pressure is applied thereto.

Preferably, the anvil assembly is designed to permit relative rotation of the outer anvil portion 30a' with respect to the inner portion of the anvil 30a" so that rotation of the outer portion during compression will not disturb the inner portion. To this end, the surface 31 is shaped so that when no pressure is applied to the anvil it engages the surface 32 only in the central area and is slightly spaced therefrom in the outer areas, as indicated by the dotted line 31'. When full pressure is applied, however, and the anvil is under maximum compression, the outer anvil portion deflects sightly so that the entire areas of the surfaces 31 and 32 are in contact as illustrated in solid lines in FIGS. 1 and 2. In all of the above respects, each of the other anvil assemblies 30b, 30c, 30d, etc. is identical to the anvil assembly 30a.

In the illustrated embodiment of the invention the location of each anvil assembly in its direction of motion prior to application of pressure can be adjusted by an anvil positioning arrangement. For the lower anvil assembly 30a, this arrangement comprises a plate 40 affixed to the outer anvil portion and a pin 41 which abuts the plate 40 and is threaded into a hole 42 in the lower head 13 to provide a stop for the anvil. By rotating the pin 41 to raise or lower it the outermost position of the anvil 30 can be varied. Each of the anvils disposed around the sides of the cage 26 is adjustably positioned by an arrangement of the type shown in FIG. 2 in connection with the anvil 30b wherein a bolt 43 is threaded into a cross shaft 44 which spans the adjacent cage opening and is affixed at opposite ends to the cage 26. The bolt 43 has an enlarged head 45 received within a recess 46 in the anvil and a retaining ring 47 prevents the head from being withdrawn from the recess. By turning the bolt 43 the outermost position of the anvil 30b in the cage opening can be adjusted. In addition, the bolt 43 can be used to retract the anvil assembly manually, if desired, when the cage 26 is removed from the housing. The top anvil assembly 30c is linked to the upper head 12 by a pin 48 which is affixed to the head and carries a ring 49 at its lower end, the ring being held captive in a recess 50 in the anvil by a retainer 51. In this case, motion of the anvil away from the head 12 is limited by the ring 49 so that this anvil can be withdrawn from the cage 26 as the head 12 is removed.

Within the cavity 29 is a cylindrical inner cage assembly 52 which is removably bolted to and centered in the outer cage by a retaining plate 53. This cage is shaped to provide an anvil configuration similar to that of the cage 26 and, in the present example, six orthogonal bores 54 cut into the ends and sides of the cage assembly 52 receive corresponding secondary anvils 55, each of these anvils being aligned with a corresponding one of the primary anvils 30a, 30b, etc.

Each of the secondary anvils 55 consists of a central cylindrical core 56 of hard material, such as tungsten carbide and a sleeve 57 shrunk around it. The outside diameter of the sleeve 57 is accurately fitted to the bore 54 and, if desired, the bore and sleeve may include a keying arrangement (not shown) to prevent rotation of the secondary anvil in its cage. Moreover, the sleeve 57 is slightly shorter than the core 56 at the outer end so that only the core abuts the adjacent primary anvil and the entire force is applied through the core. Also, the portions of each of the inner ends of the anvils 55 which are adjacent to the other secondary anvils are beveled so that a closed cavity is formed by the inner ends of all the secondary anvils, a small gap being left between the adjacent portions of these anvils when they are in the retracted position to allow for inward motion thereof. Because of this beveling the area of the inner end of each anvil is made smaller than the area of the outer end which is in contact with the corresponding primary anvil, thereby providing a pressure multiplication additional to that of the primary anvil.

A workpiece 58 to which extreme pressure is to be applied is placed within the cavity formed by the inner ends of the anvils 55 and substantially fills the cavity when the primary and secondary anvils are retracted. Preferably, as described in our above-mentioned copending application, Serial No. 785,690, the workpiece consists of an object embedded in a body of pressure-transmitting material such as a pyrophylite and, in the present embodiment of the invention, this body is in the shape of a cube. The pyrophylite material is normally rigid but has the property of becoming slightly viscous under extreme pressures, so that the forces applied by the anvils are transmitted uniformly throughout the body 58, but the material is only slightly extruded out of the cavity through the spaces between the anvils as it is compressed, thus forming a gasket.

In order to supply current to heat the workpiece while pressure is applied thereto, a plurality of insulated electrical conductors 59, only one of which is shown in FIG. 2, pass in through the lower head 12 and through the walls of the cage 26 to the intersection 60 of the bottom and side walls of the cavity 29. In addition, the temperature of the workpiece is detected by a thermocouple connected to a cable which passes through the inner cage 52 in a similar manner.

Figure 3:
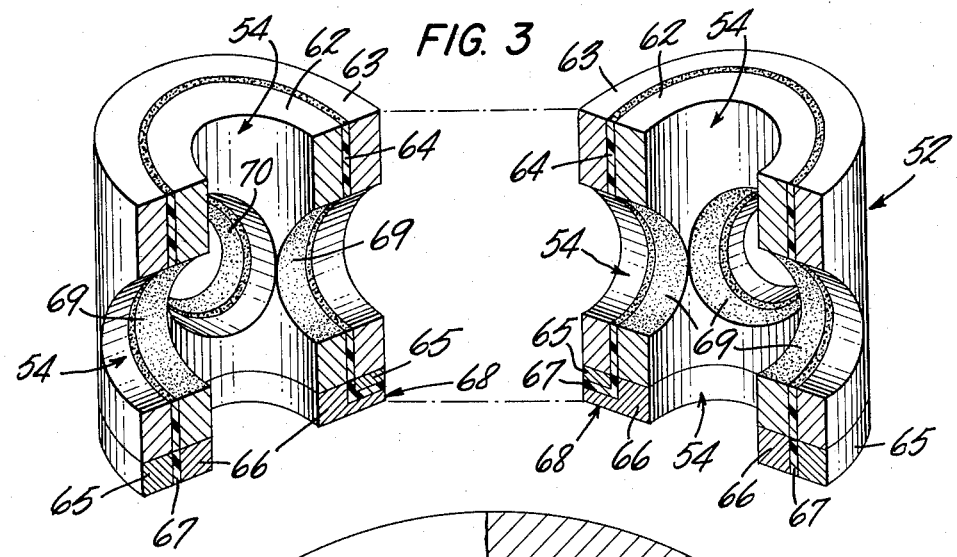
FIG. 3 is a perspective view of an inner cage arranged according to the invention which has been broken apart for convenience of explanation.

The construction of the inner cage 52 will be best understood from an examination of FIG. 3 which, for purposes of clarity, illustrates the cage as being split open on a vertical plane, although, in fact, the cage comprises a single unit consisting of an inner sleeve 62 and an outer sleeve 63 with an insulative layer 64 between them. At its lower end the cage has a split ring arrangement including an outer ring 65 in electrical contact with the outer sleeve 63 and an inner ring 66 in contact with the inner sleeve 62, along with a layer of insulation 67 between the two rings. The lower portion of one half of the outer ring 65 is cut away and the inner ring is extended outwardly in this area, as indicated at 67, so that it can make contact with some of the electrical conductors 59 at the intersection 60 when the cage is inserted in the apparatus, the remainder of the electrical conductors being in contact with the outer ring 65 along its full thickness portion.

Three of the four bores 54 which pass through the sides of the cage 52 are coated with an insulating layer 69 only along the inner sleeve portions of the bores and the other bore passing through the side of the cage is provided with an insulating layer 70 only along the outer sleeve portion of the bore. Inasmuch as the bores passing through the end walls of the cage do not intersect the outer sleeve, they do not require any insulating layer. Consequently, current flows from some of the conductors 59 through the outer ring 65, the outer sleeve 63 and three of the secondary anvils 55 into the workpiece, these anvils being made of electrically conductive material. From the work piece, which includes the usual resistive heating element (not shown), the other three anvils conduct current to the inner sleeve 62 and the inner ring 66 from which it is carried out by the rest of the conductors 59.

In operation, the apparatus of FIGS. 1 and 2 is loaded with a workpiece by removing the top plate 17 and the upper head 12 which brings with it the upper anvil 30c. The top secondary anvil 55 is then withdrawn from the inner cage 52 and the workpiece 58 inserted into the cavity. After this the secondary anvil 55, the primary anvil 30c, the head 12, and the top plate 17 are replaced and the bolts 18 and 19 are tightened to draw the head 12 up tight against the mating portion of the shell 11. If desired, the entire cage 26 may be withdrawn from the enclosure to adjust the locations of the side anvils with the bolts 43.

Current is applied through the conductors 59 until the workpiece temperature, as indicated by the thermocouple attached to the cable 61, has reached the desired value. In order to compress the workpiece a liquid, such as oil, is directed into the enclosure through the conduits 24 and 25 until it surrounds the cage and anvil assembly, air being withdrawn through the conduits 22 and 23. When the enclosure has been filled with the liquid, high pressure is applied through all the conduits and through the liquid to the outer surfaces of all the anvils 30a, 30b, etc., the sealing rings 34 being effective to prevent any liquid from seeping into the interior of the cage 26.

As the primary anvils are driven inwardly in the openings 35 they force the secondary anvils 55 inwardly against the workpiece, transmitting a pressure to the secondary anvils which is equal to the pressure of the liquid multiplied by the ratio of the outside primary anvil area to the primary anvil area in contact with the rear surface of the secondary anvil. In an apparatus similar to that of FIGS. 1 and 2 this multiplication factor is about 90. The secondary anvils, in turn, apply to the workpiece 58 a pressure which is increased by the ratio of its rear surface area to the area in contact with the workpiece and this factor is about 1.8 in the present instance, so that the total multiplication factor provided by the two anvils is about 160. As the workpiece is compressed both sets of anvils move inwardly in the cage and anvil assembly. After the hydrostatic pressure has been released the springs 37 restore the primary anvils to their normal retracted position and the workpiece can be removed by withdrawing the upper head of the enclosure in the manner described above.

In certain cases it may be necessary to subject an elongated thin object to extreme pressures of the type produced in accordance with the present invention, as, for example, in forging a rib pattern on the surface of a thin plate. To accomplish this the embodiment of the present invention shown in FIGS. 4 and 5 may be utilized. This embodiment comprises a horizontally disposed housing consisting of a tubular shell 71 having closure heads 72 and 73 mounted therein by bayonet arrangements and having sealing rings 74 to form a pressure-tight enclosure in the same manner as in the apparatus of FIGS. 1 and 2.

Figure 4:
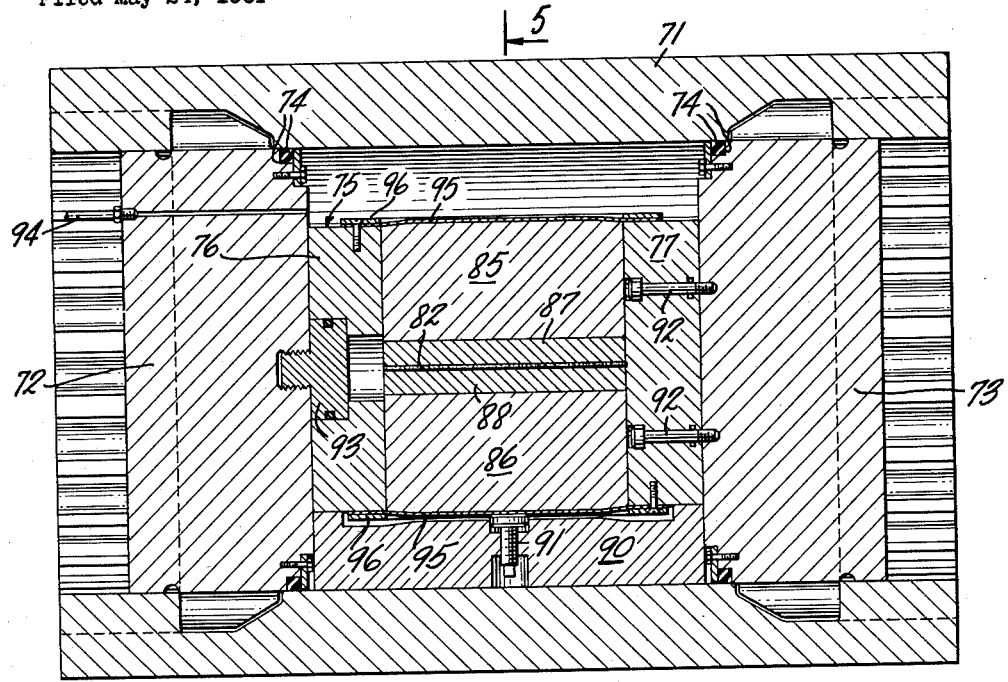
FIG. 4 is a view in longitudinal section of another form of hydrostatic apparatus arranged according to the invention taken along the line 4—4 of FIG. 5 and looking in the direction of the arrows.
Figure 5:
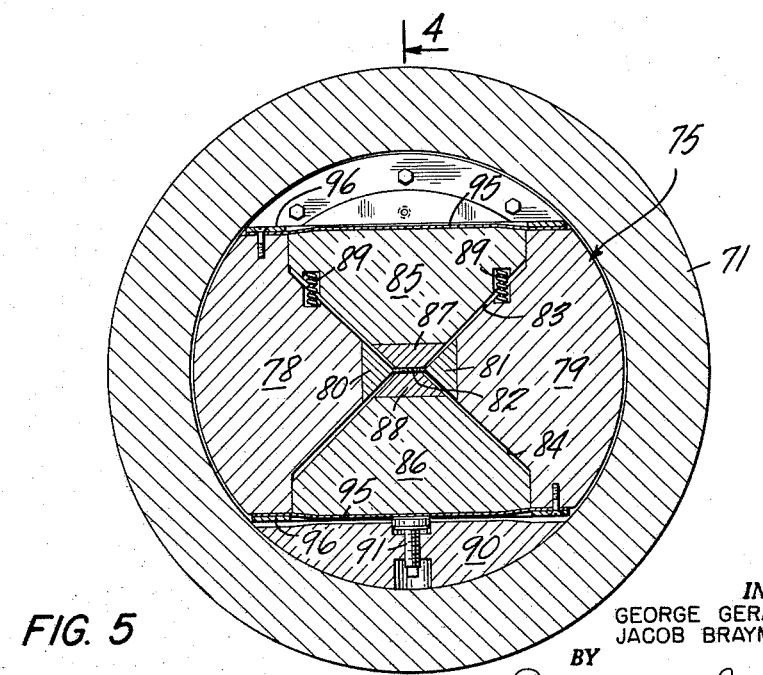
FIG. 5 is a view in transverse section of the apparatus shown in FIG. 4 taken along the line 5—5 thereof and looking in the direction of the arrows.

Within the housing enclosure is an integral anvil support and sealing cage 75 in the shape of an elongated body having two end portions 76 and 77 (FIG. 4) and two side portions 78 and 79 (FIG. 5), the latter being in the form of fixed tapered anvil members. If necessary, the tips 80 and 81 of the fixed anvils 78 and 79 may be made of a hard material such as tungsten carbide, and the apices of these tips are spaced by a distance equal to the width of an elongated thin workpiece 82 so that they provide lateral support for the workpiece or the die during forging. In two tapered openings 83 and 84 in the top and bottom of the cage 75 there are disposed movable anvil members 85 and 86, respectively, and these anvils carry at their inner ends dies 87 and 88 which are formed with the negative impression of the pattern which is to be impressed into the surfaces of the workpiece 82. As illustrated in FIG. 5, retracting devices, such as springs 89, are inserted between the upper anvil 85 and the cage to retain this anvil in a retracted position when it is not under pressure.

The entire anvil and cage assembly is supported on a bottom plate 90 provided with an adjusting bolt 91 to limit the downward motion of the lower anvil in the manner described previously with the respect to the apparatus shown in FIGS. 1 and 2. Moreover, as shown in FIG. 4, the cage 75 is attached to the head 73 by bolts 92 so that the cage and anvil assembly can be withdrawn when that head is removed from the shell 71. Affixed to the head 72 at the other end of the shell, as by threads, is a gasketed sealing plug which fits into a corresponding hole in the end of the cage 75. This plug is removable with the head 72 to provide access to the interior of the cage and anvil assembly. Also, a fluid pressure conduit 94 leads into the interior of the housing through this head.

In order to seal the interior of the cage 75 from the fluid supplied through the conduit 94 sealing means is provided at each of the tapered openings 83 and 84. In the present example the sealing means comprises a flexible diaphragm 95 covering each opening which is made of rubber or the like and held in sealing relation to the cage 75 by a rectangular frame member 96 mounted about the opening. Alternatively, if desired, each anvil may be provided with a gasket in the manner described above with respect to FIGS. 1 and 2. Consequently, pressure from the fluid in the enclosure can be transmitted to the outer surfaces of the anvils 85 and 86 but no fluid can leak into the interior of the cage.

In operation, the apparatus shown in FIGS. 4 and 5 is opened by removing the end head 72 and with it the sealing plug 93. The workpiece 82 is then inserted into the space between the anvils 85 and 86 and the apparatus is reassembled. If desired, the entire cage and anvil assembly may be removed by withdrawing the head 73. Fluid under high pressure is introduced through the conduit 94 so that acting through the diaphragms 95, it forces the anvils 85 and 86 inwardly against the workpiece to impress the die pattern on the surfaces thereof, the pressure on the workpiece being equal to the fluid pressure multiplied by the ratio of the outer and inner surface areas of the anvils. During this process the side portions 78 and 79 of the cage provide lateral support for the workpiece to prevent it from being extruded out of the space between the dies 87 and 88, or for the lateral surfaces of the die proper.

In addition to the advantages of compactness and convenience of operation previously mentioned, it will be apparent that the apparatus of FIGS. 4 and 5 permits forging under extreme pressures without the problems resulting from platen deflection usually encountered in conventional presses. Moreover, because the anvils and dies are uniformly loaded on their entire area, the dies will remain flat throughout the forging process and the forged piece will have uniform thickness throughout. Consequently long, narrow plates can be forged to very close tolerances.

Although the invention has been described herein with reference to specific embodiments many modifications and variations therein will readily occur to those skilled in the art. For example, the cage 75 of FIGS. 4 and 5 could be made with movable side anvils to provide increased lateral die support or with other anvil configurations to permit the use of multi-axis forging dies with the apparatus. If the side anvils are movable they may be slidably supported in rectangular openings in the sides of the cage 75 and shaped to provide the same pressure multiplication as the main anvils 85 and 86 and flexible diaphragms similar to those used to seal the main anvils may be provided. It will be understood that the pressure multiplication factor for the embodiment shown in FIGS. 4 and 5 is approximately five, but that other factors may be provided by using appropriate dimensions for the outer and inner surfaces of the anvils. Moreover, instead of using full diaphragms attached only to the cage, the seal between the anvils and the cage may comprise a sheet of flexible material cut in the form of a rectangle and affixed to both the cage and the anvil so as to cover their line of contact. Accordingly, all such variations and modifications are included within the intended scope of the invention as defined by the following claims.

We claim:

1. Apparatus for subjecting an object to extreme pressures comprising a housing forming a fluid-tight enclosure, means for supplying fluid under high pressure into the enclosure, cage means having a central cavity to receive the object and a plurality of tapered openings formed therein leading from the exterior of the cage means to the central cavity, each opening being arranged to receive and independently support an anvil member for limited motion toward and away from the central cavity, a corresponding plurality of pressure-multiplying anvil members each mounted in one of the tapered openings and having a large area surface exposed to the pressure of a fluid in the enclosure and a small area surface directed toward the central cavity to transmit increased pressure to an object therein, and means forming a pressure-tight seal at the outer end of each opening in the cage means to prevent fluid from passing into the interior of the cage means.

2. Apparatus according to claim 1 including means within the cage means for applying a force between the cage means and an anvil member to urge the anvil member outwardly toward a retracted position.

3. Apparatus according to claim 2 wherein the means for applying a force comprises spring means extending between the cage means and the anvil member.

4. Apparatus according to claim 1 including adjustable anvil positioning means for limiting the extent of motion of an anvil member toward or away from the central cavity.

5. Apparatus according to claim 1 including second cage means located within the central cavity having a plurality of intersecting openings aligned with the tapered openings, and a plurality of secondary anvil members disposed in the openings of the second cage means to transmit pressure from the primary anvil members to the object located at the intersection of the openings.

6. Apparatus according to claim 5 wherein the second cage means comprises inner and outer electrically conductive portions separated by an insulating layer and the secondary anvil members are made of electrically conductive material, and including insulating means in at least one of the openings of the secondary cage means for electrically insulating one portion of the cage means from the corresponding anvil member.

7. Apparatus according to claim 1 wherein at least one of the anvil members comprises an outer portion having an inner surface extending transversely to the direction of anvil motion and an inner portion having an outer surface extending transversely to the direction of anvil motion, and the outer and inner surfaces are shaped so that they normally are in contact only in the central portion of their areas but when the outer portion deflects under pressure, the two surfaces come into contact over substantially their entire areas.

8. Apparatus according to claim 1 wherein the housing comprises a cylindrical shell with two end heads and at least one of the end heads is removably connected to the shell by a bayonet joint.

9. Apparatus according to claim 1 wherein the cage means has a cubic configuration and includes six tapered openings disposed on orthogonal axes.

10. Apparatus according to claim 1 wherein the cage means is formed with two oppositely disposed tapered openings and includes at least one portion located adjacent to the intersection of the openings, to provide lateral support for an object under pressure.

11. In apparatus for subjecting an object to extreme pressures, a plurality of relatively movable tapered anvil members each having a large area outer surface, a small area inner surface, and a peripheral surface portion adjacent to the outer surface which extends parallel to the direction of anvil motion, and an anvil support cage having a plurality of tapered anvil-receiving openings adapted to receive the anvil members and provide seats for the tapered portions thereof, each opening having a surface portion which extends parallel to the direction of motion of the corresponding anvil member and which surrounds and engages the peripheral surface portion adjacent to the outer surface of the corresponding anvil member in sliding pressure sealing relation.

12. In apparatus for subjecting an object to extreme pressures including a plurality of tapered anvil members, an anvil cage having a plurality of tapered anvil-receiving openings, a corresponding plurality of anvil members received in the openings for motion between a retracted and a pressure-transmitting position, and sealing means at each opening providing a pressure-tight seal to prevent fluid from reaching the interior of the cage while permitting anvil motion in the opening.

13. Apparatus according to claim 12 wherein the sealing means comprises a sealing ring interposed between each anvil and the adjacent wall of the cage opening.

14. Apparatus according to claim 12 wherein the sealing means comprises a flexible diaphragm extending across each opening in the cage.

15. In apparatus for subjecting an object to extreme pressures a pressure-multiplying anvil member comprising an outer anvil portion having a rear surface to be exposed to a medium under pressure and a front surface extending transversely to the direction of pressure-transmitting motion, and an inner portion having a front surface for transmitting pressure to an object and a rear surface extending transversely to the direction of anvil motion, the rear surface of the inner portion and the front surface of the outer portion being formed so as to be in contact only in their central areas when the anvil member is not under compression and to engage over their entire areas in response to bending of the outer portion when the anvil member is under compression.

16. In apparatus for subjecting an object to extreme pressures and high temperatures, a cage assembly having a plurality of anvil receiving bores intersecting at a central cavity comprising an electrically conductive inner shell, an electrically conductive outer shell, a layer of insulation between the inner and outer shells, means providing electrical insulation at the surface of the inner shell of at least one of the bores, a plurality of electrically conductive anvil members inserted in the bores so that at least one of them conducts current between an object in the central cavity and the inner shell and at least one other conducts current between the outer shell and the object, and means for supplying electrical current to the inner and outer shells.

17. Apparatus for subjecting an elongated thin object to extreme pressures comprising a housing forming a fluid-tight enclosure, means for supplying fluid under high pressure into the enclosure, cage means having an elongated central cavity to receive the object and at least two oppositely disposed tapered openings formed therein leading from the exterior of the cage means to the central cavity, each opening being arranged to receive a tapered anvil member and permit limited motion thereof toward and away from the central cavity, rigid support means integral with the cage means adjacent to the cavity to provide lateral support for an object therein, at least two pressure-multiplying anvil members mounted in the tapered openings carrying a die member of relatively small surface area at the inner end thereof to engage the object and having a large outer surface area exposed to the pressure of a fluid in the enclosure and means forming a pressure-tight seal at the outer end of each opening in the cage means to prevent fluid from passing into the interior of the cage means.

18. Apparatus according to claim 17 wherein the means forming a pressure-tight seal comprises a flexible diaphragm covering the opening.

19. Apparatus according to claim 17 including spring means extending between at least one of the anvil members and the cage means to restore the anvil member to a retracted position when high pressure on its exterior surface is released.

References Cited in the file of this patent
UNITED STATES PATENTS

| | | |
|---|---|---|
| 2,499,530 | Scott | Mar. 7, 1950 |
| 2,941,246 | Bundy | June 21, 1960 |
| 2,968,837 | Zeitlin et al. | Jan. 24, 1961 |